US010019765B2

(12) United States Patent
Himel et al.

(10) Patent No.: US 10,019,765 B2
(45) Date of Patent: Jul. 10, 2018

(54) DETERMINING AND PROVIDING FEEDBACK ABOUT COMMUNICATIONS FROM AN APPLICATION ON A SOCIAL NETWORKING PLATFORM

(75) Inventors: Alex Himel, Palo Alto, CA (US); Gabriel Levi, San Francisco, CA (US); Carl Philip Sjogreen, San Francisco, CA (US); Wayne Kao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 935 days.

(21) Appl. No.: 13/534,477

(22) Filed: Jun. 27, 2012

(65) Prior Publication Data

US 2014/0006489 A1 Jan. 2, 2014

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ........ G06Q 50/01; H04L 12/588; H04L 51/32
USPC .......................................................... 709/204
See application file for complete search history.

(56) References Cited

U.S. PATENT DOCUMENTS 8,024,211 B1 * 9/2011 Cohen .................... G06Q 10/06 705/7.14
8,539,359 B2 * 9/2013 Rapaport ............... G06Q 10/10 709/217
8,880,529 B2 * 11/2014 Klar .................... G06F 17/3082 707/738
2007/0208613 A1 * 9/2007 Backer ................. G06Q 10/107 715/234
2008/0082607 A1 * 4/2008 Sastry et al. .................. 709/204
2010/0042618 A1 * 2/2010 Rinearson ......... G06F 17/30867 707/723
2011/0047620 A1 * 2/2011 Mahaffey .............. G06F 21/564 726/23
2011/0314007 A1 * 12/2011 Dassa ............... G06F 17/30893 707/723
2012/0240236 A1 * 9/2012 Wyatt ................... G06F 21/564 726/25
2013/0073473 A1 * 3/2013 Heath .................... G06Q 30/02 705/319
2013/0282504 A1 * 10/2013 Lessin et al. ................ 705/26.1
(Continued)

*Primary Examiner* — SM Rahman
(74) *Attorney, Agent, or Firm* — Fenwick & West LLP

(57) ABSTRACT

A social networking system (SNS) may determine the integrity of a social application. In particular, the SNS can receive communications and tags associated with different subsets of the communications from the social application. Thereafter, the SNS can distribute the communications, and monitor for user interactions performed on the communications. Subsequently, feedback indicating the integrity of the social application can be provided. The feedback can be based on the user interactions performed on the communications. The feedback can also be provided according to the tags. In particular, a set of feedback information can be provided for each tag, where the set is based on the user interactions performed on the subset of communications associated with the tag. By providing feedback in this manner, A-B testing can be performed. In one embodiment, the operating state for the social application can be determined based on the integrity of the SNS.

17 Claims, 3 Drawing Sheets

(56) References Cited

U.S. PATENT DOCUMENTS

2014/0074639 A1* 3/2014 Tian .................. G06Q 30/0631
705/26.1

* cited by examiner

DETERMINING AND PROVIDING FEEDBACK ABOUT COMMUNICATIONS FROM AN APPLICATION ON A SOCIAL NETWORKING PLATFORM

BACKGROUND

This invention relates to social networks and in particular to determining and providing feedback about the integrity of communications sent by an application on a social networking platform.

Social networking systems allow users to connect and interact with each other using various communication channels of the systems. For example, a user may post contact information, background information, job information, hobbies, and/or other user-specific data to a location associated with the user on a social networking system. Other users can then review the posted data by browsing user profiles or searching for profiles including specific data. Social networking systems also allow users to associate themselves with other users, thus creating a web of connections among the users of the systems.

Social networking systems may further act as platforms for social applications, which provide various additional functionalities that leverage the social connections maintained by the social networking systems. These social applications can be configured to distribute various communications (e.g., stories, advertisements, etc.) to their users using the communication channels of the social networking systems. For example, a social application may allow users to play a game, share photos, or otherwise interact with their connections in a social networking system, where the social application obtains a user's connections from the social networking system rather than maintaining its own user profile for each user.

Since these social applications are often provided and operated by third party entities external to the social networking systems, some of the social applications may cause communications to be distributed over the social networking systems that are unwanted (e.g., spam), offensive, or otherwise poorly perceived by users. Current social networking systems may automatically detect that social applications are sending poor quality communications and take appropriate action, such as blocking the applications from sending further communications. Such remedies may be highly disruptive to the applications and their users, and in many cases the applications have little advance warning that their communications are about to cause remedial action by the social networking systems. Therefore, even well-intentioned application providers are unable to get useful information about their communications before it is too late.

SUMMARY

Embodiments of the invention are directed to determining and providing feedback regarding the integrity of one or more communications from a social application. In one embodiment, a social networking system may receive one or more communications from a social application. The communications may be, for example, stories, advertisements, comments, posts on a page of the application, posts on other pages, in-application messages, notifications, and/or the like. The social networking system may additionally receive one or more tags, which may be associated with the one or more communications. Each tag may be associated with a different subset of the one or more communications. Illustratively, the social networking system may receive twenty different communications from a social application. A first twelve of the communications may be associated with a tag A. The remaining eight communications may be associated with a tag B. In one embodiment, a tag may be a string passed in with an API call that, at least in part, causes the generation of communication.

After receiving the communications and the tags, the social networking system distributes the communications to one or more of its users. Following distribution of the communications, the social networking system monitors and records the user interactions performed on the one or more communications. For example, the social networking system can determine when a user has commented on, liked, shared, hidden, tagged (e.g., photo tagged), clicked through, reviewed, questioned, viewed, initiated a wall-to-wall communication, and/or reported a violation regarding a particular communication.

In monitoring the communications, the social networking system may identify both direct and downstream user interactions performed on the communications. As used herein, a direct user interaction may refer to an interaction performed by a user on a communication, where the communication was specifically targeted at the user by the social networking system. A downstream user interaction may refer to an interaction performed by a user on a communication, where the communication was distributed to the user responsive to an interaction performed by at least one of the user's connections. For example, a communication directly targeted to a user may be shared several times by the user with his or her social network connections. Such sharing interactions performed by the user may be considered to be direct user interactions. Thereafter, the connections of the user may share and/or otherwise interact with the communication. The connections' own connections may additionally share and/or otherwise interact with the communication, and so on, creating a viral distribution of the communication. These subsequent interactions by the various immediate and non-immediate connections of the user may be considered downstream interactions.

After monitoring and recording the user interactions performed by its users, the social networking system determines integrity scores for the social application. More specifically, an integrity score can be computed for each communication, for each tag, and/or for all the communications received from the social application. Each integrity score may indicate the overall user perception for a particular communication, the communications associated with a particular tag, and/or for all the communications of the social application. Each score may be indicated as a number on a scale or as a discrete category. For example, a low numerical integrity score may indicate a relatively poor perception for a particular communication by the users of a social networking system.

In one embodiment, the system may compute sets of integrity scores for the social application based on different categories of integrity. For example, the system may compute integrity scores based on a spam category, an offensive category, an irrelevant category, etc. Each of the integrity scores in a set may represent the user perception for a communication, the communications associated with a particular tag, and/or for all the communications of the social application with respect to a certain category. Illustratively, an integrity score for a communication with respect to a spam category may indicate how much the communication is perceived by users as spam.

In one embodiment, feedback may be generated for the communications of the social application. The feedback may be organized on an overall application basis (i.e. feedback pertaining to all of an application's communications), on a per tag basis, and/or on an individual communication basis. In one embodiment, the feedback can include integrity ratings for the social application, tags, and/or individual communications. Each integrity rating may be based on the previously computed integrity scores. The integrity ratings may provide general quality ratings for the social application as a whole, for the tags associated with the social application, and/or the individual communications of the application. As an example, an integrity rating may indicate whether the social application, a tag, or an individual communication has an excellent, fair, or unsatisfactory integrity. As another example, the rating may indicate whether the social application, a tag, or an individual communication is within a "warning" range in which it would be in danger of invoking remedial action by the social networking system.

In one embodiment, the feedback can additionally include the computed integrity scores. Furthermore, the feedback can include the raw user interaction counts for each tag, each individual communication, and/or for all the communications of the social application. For example, the feedback can include information specifying the number of times users have commented on, liked, shared, hidden, tagged (e.g., photo tagged), clicked through, reviewed, questioned, viewed, shared, initiated a wall-to-wall communication, and/or reported a violation on the communications related to a tag.

After generating the feedback, the social networking system can provide the feedback to an operator of the social application. Using the feedback, an operator of the social application can understand the overall perception of the communications generated by the social application. Such feedback may allow the operator to understand whether the application is in danger of being subjected to remedial action by the social networking system for sending poorly perceived communications to the system's users. Furthermore, by enabling the tagging of communications, the social networking system enables A-B testing of the application. More specifically, operators ca tag different types of communications with different tags, and receive feedback comparing how the different types of communications are perceived.

In one embodiment, the integrity scores generated by the social networking system may be used to modify the operating state of a social application. For example, if the social application does not meet certain integrity thresholds, the social networking system may move the social application to a limited or disabled state. In this way, social applications that are perceived poorly can be prevented from communicating with the users of a social networking system.

The features and advantages described in this summary and the following detailed description are not all-inclusive. Many additional features and advantages will be apparent to one of ordinary skill in the art in view of the drawings, specification, and claims hereof.

Figure 1:
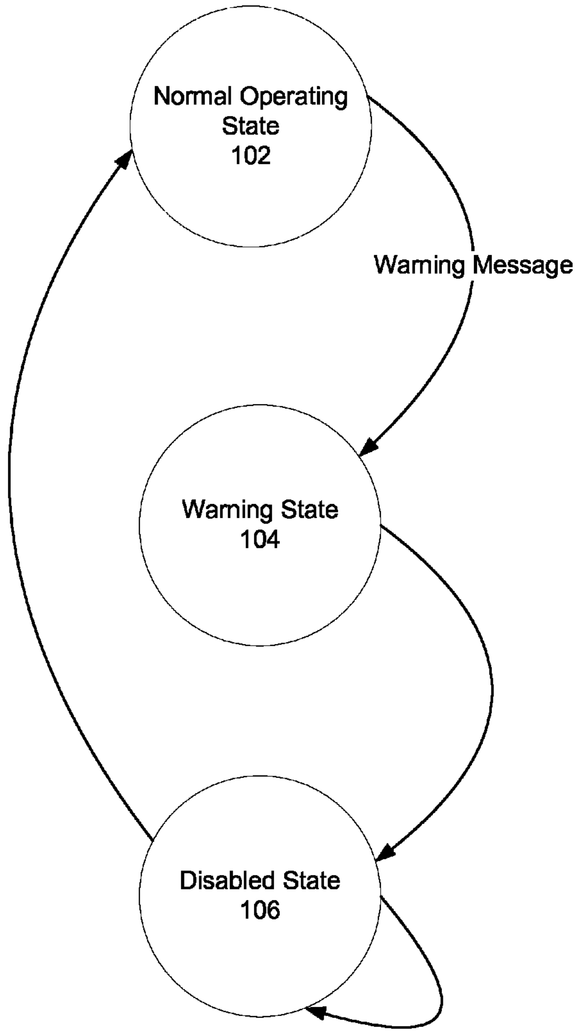
FIG. 1 is a high level diagram illustrating the various operating states of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

In addition to interactions with other users, the social networking system provides users with the ability to perform various types of activities with social networking objects supported by the system. A social networking object can represent a variety of things, including, without limitation, profiles, social applications (e.g., games playable within the social networking system), events (e.g., a page representative of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, communications of applications, etc. A user can interact with a social networking object by associating with the object or performing an action on the object. For example, a user can interact with a communication sent by a social application by "liking" the communication, sharing the communication, commenting on the communication, etc. These are just a few examples of the interactions that which a user may perform in a social networking system, and many others are possible.

In one embodiment, the social networking system determines the integrity of a social application associated with the social networking system. The social networking system additionally provides feedback to an operator of the social application regarding the application's integrity. As used herein, a social application may be any suitable entity capable of generating communications (e.g., stories, comments, status updates, advertisements, generic posts, etc.) that may be distributed within a social networking system. As also used herein, the integrity of a social application may be defined as the perception of the application and/or the application's communications by the users of a social networking system.

In determining the integrity of a social application, the social networking system distributes one or more communications received from the social application. For example, the social networking system can send the communications to one or more users such that the users can view the communications. In one embodiment, the social networking system may additionally receive one or more tags, which may be associated with the one or more distributed communications. More specifically, each tag may be associated with a different subset of the one or more communications.

Following distribution of the communications, the social networking system monitors the various interactions performed by its users on the communications. For example, the social networking system may identify and record instances where a user has commented on, liked, shared, hidden, tagged (e.g., photo tagged), clicked through, reviewed, questioned, viewed, initiated a wall-to-wall communication, or reported a violation regarding a particular communication. Based on the user interactions, the social networking system computes integrity scores for the communications. In one embodiment, an integrity score may be computed for each individual communication based on the various user interactions performed on the communication. In one embodiment, an integrity score may be computed for each tag. In the implementation, the integrity score for each tag can be based on the various user interactions performed on the communications associated with the tag. In one embodiment, an integrity score may be computed for all of the communications of the social application.

Each computed integrity score can provide an indication regarding the overall user perception for a particular communication, for the communications associated with a particular tag, or for all the communications of the social application. For example, the integrity score for a particular communication may be determined to have a low value because the communication has generally a poor perception among users. In one embodiment, several different integrity scores can be computed for each communication, for each tag, or for all the communications of the social application. More specifically, the social networking system may compute a set of integrity scores based on different categories in which users may indicate that a communication has poor integrity (e.g., a spam category, a general offensive category, an irrelevant category, etc.).

In one embodiment, feedback information for the communications of the social application can be provided to an operator of the application. The feedback information may include aggregated information for all of the application's communications, information for the application's communications organized by tag, or information organized by individual communication. In one embodiment, the feedback information can indicate an integrity rating for the application's communications as a whole, for each tag and/or for each individual communication received from the social application. For example, the feedback information may include a rating for a first tag and a different rating for a second tag. The determined ratings can be based on the previously computed integrity scores. In one embodiment, the feedback information can further include the computed integrity scores. In one embodiment, the feedback information can moreover include statistics for each tag and/or each individual communication. The statistics can include counts for the number of times users have performed certain types of interactions with the communications of the social application. For example, the feedback information can include the number of likes for the communications associated with a particular tag, the number of comments for a particular communication, etc.

By providing feedback information to an operator of a social application, the social networking system enables operators to receive information regarding the perception of the communications being generated by the application. Such information can be used by the operators to improve the perception of their communications.

Furthermore, by enabling communications to be tagged with tags and providing feedback information based on the tags, the social networking system permits A-B testing by application operators. For example, a first tag can be associated with a first group of communications. The first group of communications can include a certain type of content that an operator of a social application wishes to test. A second tag can be associated with a second group of communications. The second group of communications can include baseline content. Following distribution of the communications, feedback for the two tags can be compared in order to determine how the types of content are perceived in relation to one another.

In one embodiment, the computed integrity scores may be used to determine an operating state for the application. In particular, if an integrity score for all of a given application's communications falls below a certain threshold, the application may be shifted from one operating state to the next. In one embodiment, an application may be placed within one of three operating states: a normal operating state, a warning state, and a disabled state. Referring to FIG. 1, a diagram illustrating an example of the various operating states for a social application in a social networking system is shown. In FIG. 1, a social application may begin in the normal operating state 102. If the integrity score for the communications of the application fall below a certain threshold, the social application is shifted to the warning state 104. In the warning state, the social application may also operate normally within the social networking system. However, in moving from the normal operating state to the warning state, the social networking system may provide an operator of the application with a warning that the integrity of the application has fallen below an acceptable threshold. The warning may additionally indicate how closely the application is operating to the threshold (or an even lower threshold for a next lower state), and when the application may be shifted to an even lower state if it continues operating at an unacceptable level.

If the application maintains an integrity score below the acceptable threshold for an additional period of time or falls below an even lower integrity threshold, the social networking system may move the application to the disabled state 106. While in the disabled state, the social application may not be permitted to operate normally. In particular, the social application may be prevented from initiating the distribution of communications to the users of the social networking system. The social application may be placed in a "sandbox" environment to enable testing. Thereafter, the social networking system may move the social application from the disabled state to the normal operating state after a period of time, or after it is determined that the application will operate with an acceptable integrity in the future.

System Architecture

Figure 2A:
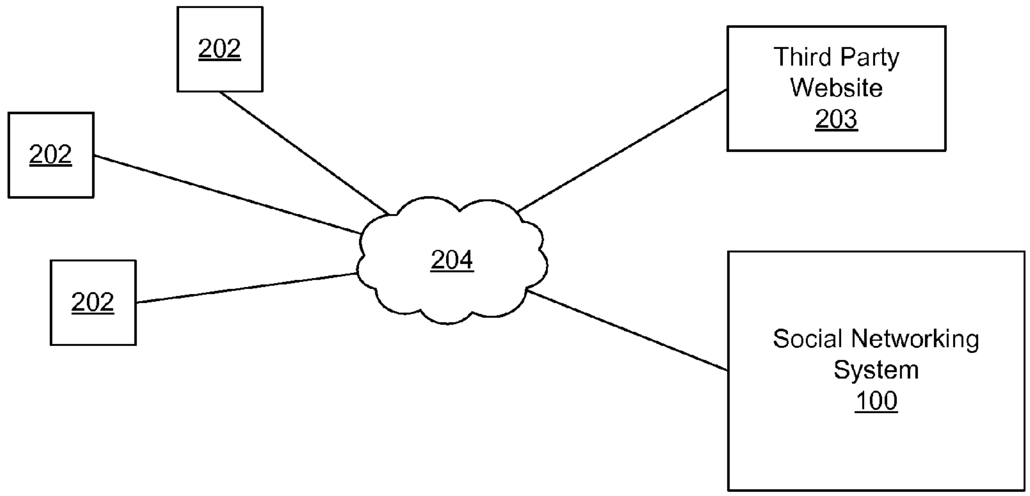
FIG. 2A is a high level block diagram illustrating a system environment suitable for operation of a social networking system, in accordance with an embodiment of the invention.

FIG. 2A is a high level block diagram illustrating a system environment suitable for operation of a social networking system 100. The system environment includes one or more client devices 202, one or more third-party websites 203, a social networking system 100, and a network 204. While only three client devices and one third-party website are shown in FIG. 2A, it should be appreciated that any number of these entities (including millions) can be included. In alternative configurations, different entities can also be included in the system.

The network 204, in general, can be any network, including but not limited to any combination of the Internet, a mobile network, a LAN, a wired or wireless network, a private network, and/or a virtual private network.

The client devices 202 include one or more computing devices that can receive user input and can transmit and receive data via the network 204. For example, the client devices 202 may be desktop computers, laptop computers, tablet computers (pads), smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 can provide a means by which various users can communicate with the social networking system 100. The third party website 203 is coupled to the network 204 in order to communicate with the social networking system 100. In one embodiment, the third party website 203 may include a social application that can cause communications to be distributed to various users of the social networking system. In another embodiment, a social application can be included in the social networking system 100.

The social networking system 100 includes a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally stores other objects, such as fan pages, events, groups, advertisements, general postings, etc.

Figure 2B:
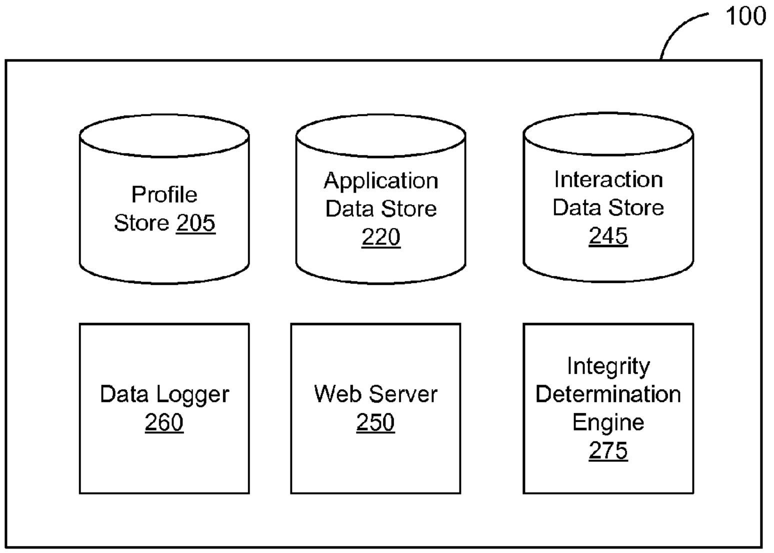
FIG. 2B is a block diagram of various components of a social networking system, in accordance with an embodiment of the invention.

FIG. 2B is an example block diagram of various components of the social networking system 100. The social networking system 100 includes a profile store 205, an application data store 220, an interaction data store 245, a data logger 260, a web server 250, and an integrity determination engine 275.

In general, the web server 250 links the social networking system 100 via the network 204 to one or more of the client devices 202, as well as to one or more third party websites 203. The web server 250 may include a mail server or other messaging functionality for receiving and routing messages between the social networking system 100 and the client devices 202 or third party websites 203. The messages can be instant messages, queued messages (e.g., email), text and SMS messages, or any other suitable messaging technique. In one embodiment, the web server 250 can distribute communications received from one or more social applications to the users of the social networking system 100.

The data logger 260 may identify the different interactions users may have with a number of different types of social networking objects in the social networking system 100. For example, the data logger 260 can monitor and record the various user interactions with a particular communication generated by a social application. More specifically, the data logger 260 can identify and record when a user commented on, liked, shared, hidden, tagged (e.g., photo tagged), clicked through, reviewed, questioned, viewed, initiated a wall-to-wall communication, and/or reported a violation regarding a particular communication. The data logger 260 may identify and record direct and downstream user interactions for a communication.

The social networking system 100 can maintain the data recorded by the data logger 260. In one embodiment, each of the profile store 205, the application data store 220, and the interaction data store 245 store data structures to manage the data for each instance of a corresponding type of social networking object maintained by the system 100. The data structures include information fields that are suitable for the corresponding type of object. (For example, the interaction data store 245 contains data structures suitable for logging the interactions performed on the communications of a social networking system whereas the application data store 220 contains data structures suitable for storing the various communications and tags received from social applications). When a new object of a particular type is created, the system 100 initializes a new data structure of the corresponding type, assigns a unique object identifier to it, and begins to add data to the object as needed.

The integrity determination engine 275 determines integrity scores based on the communications received from a social application, provides feedback based on the integrity scores, and updates the operating state of the social application based on the integrity scores. In one embodiment, the integrity determination engine 275 receives a set of communications from a social application. The communications may include stories, comments, advertisements, reviews, video, audio, links (e.g., universal resource locators), embedded applications, generic posts, and/or the like. In addition to receiving the communications, the integrity determination engine 275 receives one or more tags associated with the communications. Each tag can be associated with a different subset of the one or more communications. For example, a first subset of communications may be associated with a first tag. A second subset of communications may be associated with a second tag. In one embodiment, the tags may be defined by an operator of the social application or some other suitable entity. More specifically, an operator of the social application may select the communications to be associated with a particular tag. The operator may additionally provide a unique identifier for the tag. In other embodiments, the social application or the social networking system 100 may automatically provide a unique identifier for the tag.

After receiving the communications and tags, the integrity determination engine 275 can cause the communications to be distributed to one or more users of the social networking system. For example, the communications may be sent to the client devices of users of the social networking system. The client devices may thereafter provide, for display, a user interface displaying the communications. In one embodiment, the communications can be distributed to one or more users based on targeting criteria for the users. For example, the communications can be distributed to the one or more users based on the interests, genders, ages, locations, and/or other information indicated in the users' social networking user profiles. The communications can also be distributed based on the various social networking connections for the users and/or on other social signals.

Following distribution of the communications, the integrity determination engine 275 determines integrity scores based on the user interactions performed on the various communications. In one embodiment, the user interactions used to determine the integrity scores may be those interactions performed by users within a certain time period. For example, an integrity score may be computed based on those user interactions performed on a communication within a particular 24 hour time period.

In one embodiment, the interactions may have been recorded by the data logger 260 and stored in the interaction data store 245. As such, the integrity determination engine 275 may retrieve the interaction data for the various communications from the interaction data store 245. Upon retrieving the data, the integrity determination engine 275 may compute integrity scores for the various distributed communications, for the tags associated with the communications, and for the social application as a whole.

In computing the integrity scores, the integrity determination engine 275 may assign an integrity value to each of the different user interactions performed on the communications distributed by the engine 275. Each assigned value may be representative of the perception of a particular communication as indicated by the user interaction performed on the communication. For example, a hide type user interaction may have a negative or low value. Such a value can be indicative of a generally negative perception for a particular communication. As another example, a like type user interaction may have a positive or high value. Such a value can be indicative of a generally positive perception for a particular communication. In one embodiment, the integrity determination engine 275 may process the content of a communication to determine the perception of the communication. Illustratively, the integrity determination engine 275 may process the text of a comment to determine whether the comment is generally positive or negative. In processing the content of a communication to make such a determination, the integrity determination engine 275 may use any suitable algorithm to determine the subject of the communication. For example, may employ a natural language processing algorithm to determine the subject of a communication.

Upon determining the integrity value for each user interaction, the integrity determination engine 275 computes integrity scores for each individual communication, for each tag, and/or for the application. In particular, in computing an integrity score for an individual communication, the integrity determination engine 275 may sum the integrity values for the user interactions performed on the communication, and thereafter divide the sum by the number of interactions for the communication. In computing an integrity score for an individual tag, the integrity determination engine 275 may sum the integrity values for the user interactions performed on the communications associated with the tag, and thereafter divide the sum by the number of interactions for the communications. For example, a tag may be associated with a first communication and a second communication. Users may have interacted with each communication three times. As a result, the integrity score for the tag can be equal to the sum of the integrity values for the six different interactions performed on the first and second communications divided by six. In computing the integrity score for the social application, the integrity determination engine 275 may sum the integrity values for the user interactions performed on all the communications of the social application. Thereafter the integrity determination engine 275 may divide the sum by the number of interactions for all of the communications of the social application.

In one embodiment, the integrity determination engine 275 may generate a set of integrity scores for each tag, communication, and/or the social application. Each integrity score in a set may be associated with a different category. For example, a communication may have integrity score for a spam category, an offensive category, an irrelevant category, etc. Each integrity score may be based on different types of user interactions. For example, the integrity score for the spam category may be based on a number of violation reports received from users with respect to a communication. In contrast, the offensive category may be based on a number of hide type interactions initiated by users with respect to the communication.

For ease of understanding, the description will discuss communications, tags, and/or the social application as being each associated with a single integrity score. However, it should be appreciated that a communication, tag, or the social application can be associated with a number of different integrity scores for different categories. Likewise, any provided feedback associated with the integrity scores may also be associated with a number of different categories.

Based on the computed integrity scores, the integrity determination engine 275 can generate feedback for the social application. In one embodiment, the feedback may indicate an integrity rating for each tag, for each communication, and/or for the social application as a whole. As an example, an integrity rating may indicate that a tag, individual communication, and/or the social application is either: excellent, fair, or unsatisfactory. As another example, the rating may simply indicate whether a tag, individual communication, and/or the social application is within a "warning" range in which it would be in danger of invoking remedial action by the social networking system.

Determination of the integrity ratings may be based on the previously computed integrity scores. In particular, each integrity rating may be associated with a particular range of integrity scores. The integrity determination engine 275 can determine a specific integrity rating by determining the range within which an associated integrity score falls.

In another embodiment, the feedback can additionally or alternatively include the computed integrity scores. In still another embodiment, the feedback can additionally or alternatively include the raw user interaction counts for each tag, for each individual communication, and/or for the social application as a whole. Each count can indicate the number of times the users of the social networking system have performed a particular type of user interaction on an individual communication, the communications associated with a particular tag, and/or on all the communications of the social application. In one embodiment, the feedback can include counts for at least some of the following user interaction types: a viewed type, a hidden type, a liked type, a positive comment type, a negative comment type, a shared type, a linked type, a click through type, a tag type, and a violation reported type. As an example, the feedback provided by the integrity determination engine 275 can indicate that the communications associated with a particular tag have been viewed 20 times, hidden 3 times, and liked 15 times. It should be appreciated that the counts for other user interaction types may also be included.

After generating the feedback, the integrity determination engine 275 can provide the feedback to an operator of the social application. In one embodiment, the integrity determination engine 275 and/or the web server 250 may provide, for display, a user interface (e.g., a dashboard) in which the feedback can be displayed to the operator. In another embodiment, the integrity determination engine 275 and/or the web server 250 may send feedback information to an operator via email, SMS messaging, etc. In one embodiment, the feedback can be presented in a manner such that the integrity ratings, integrity scores, and/or user interaction counts can be broken down based on the application as a whole, based on different tags and/or based on each individual communication received from the social application. In one embodiment, the integrity scores and feedback information can be periodically or continuously updated based on additional communications received from the social application and/or additional interactions performed by users of the social networking system.

In one embodiment, the integrity determination engine 275 can additionally shift the social application that provided the communications into one or more operating states. The operating states can include: a normal operating state, a warning state, and a disabled state. In one embodiment, the states may be logically tiered such that the normal operating state is the highest state, the warning state is below the normal operating state, and the disabled state is below the warning state.

In one embodiment, the integrity determination engine 275 may shift a social application from its current state to a lower state if the integrity score for the social application as a whole falls below an acceptable threshold. The threshold may have been previously established by an operator of the social networking system or may be automatically determined by the social networking system. For example, the social networking system may automatically determine the average integrity score for a number of social applications associated with the social networking system 100. The threshold integrity score may thereafter be established as a certain value below the average.

If the integrity determination engine 275 determines that the social application's integrity score is below the threshold, the integrity determination engine 275 can shift the social application to a lower operating state. For example, the integrity determination engine 275 may shift the social application from the normal operating state to the warning state. If after a certain time period, the integrity determination engine 275 determines that the integrity score for the social application continues to be below the threshold or has reached an even lower second threshold, the integrity determination engine 275 can shift the social application to the next lower operating state. For example, the integrity determination engine 275 can shift the social application from the warning state to the disabled state.

In one embodiment, the normal operating state can be the default state for a social application. While in the normal operating state, the social application can operate normally within the confines of the social networking system. For example, the social application can distribute communications to the various users of the social networking system subject to the privacy and other rules for the social networking system. In the embodiment, the social application may also operate normally while in the warning state. However, in moving from the normal operating state to the warning state, the social networking system may provide an operator of the application with a warning that the integrity of the application has fallen below an acceptable threshold. While in the disabled state, the social application may not be permitted to operate normally. In particular, the social application may be prevented from initiating the distribution of communications to the users of the social networking system. In the embodiment, the social application may be shifted from the disabled state to a normal operating state after a certain period and/or after satisfying certain defined requirements. For example, the social application may be shifted from the disabled state to the normal operating state after a period of seven days. As another example, the social application may be shifted from the disabled state to the normal operating state after an operator of the application demonstrates to an operator of the social networking system that the application will operate with an acceptable integrity score in the future.

Method for Determining and Providing Feedback

Figure 3:
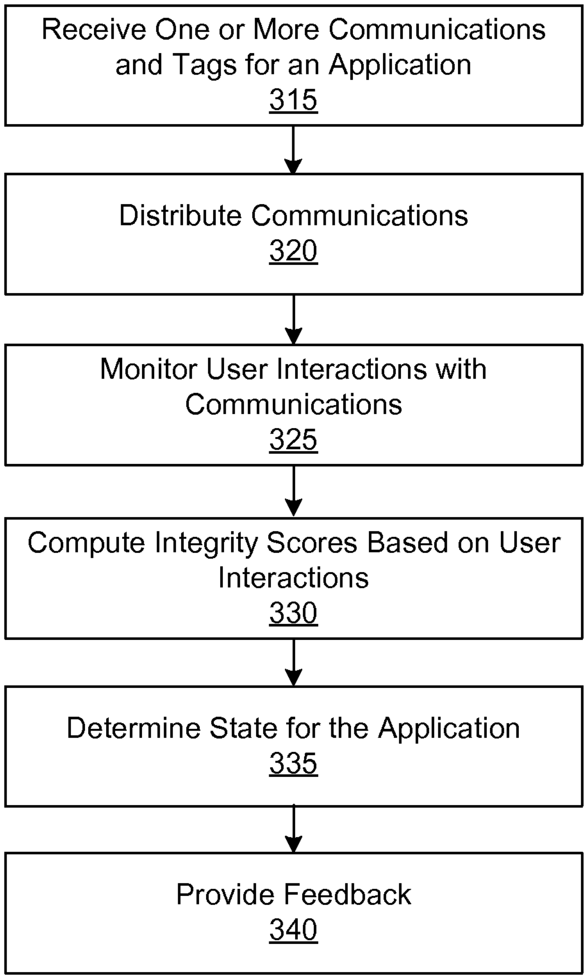
FIG. 3 is a flow chart of a process for determining the integrity of a social application and providing feedback regarding the determined integrity, in accordance with an embodiment of the invention.

FIG. 3 illustrates one embodiment of a process for determining integrity and providing feedback. In one embodiment, the process receives 315 one or more communications from an application. The communications may be, for example, stories, advertisements, comments, posts on a page of the application, posts on other pages, in-application messages, notifications, and/or the like. The process may additionally receive one or more tags associated with the communications. Thereafter, the process distributes 320 the received communications to one or more users of a social networking system. In one embodiment, the distribution may be viral (e.g., distributed to users via a newsfeed in response to interactions performed by the users' connections). After distributing the communications, the process monitors 325 various user interactions performed on the communications. For example, the process can identify and record data indicating the number of times each communication has been viewed, liked, clicked through, commented on, shared, hidden, reported as a violation, and/or the like. In the example, negative commenting interactions, hide interactions and/or violation reporting interactions may be considered negative interactions. Likewise, viewing interactions, liking interactions, positive commenting interactions, sharing interactions, and click through interactions may be considered positive interactions.

Based on the recorded interaction data, the process 330 computes integrity scores. Based on the computed integrity scores, the process 335 determines a state for the application. For example, if the computed integrity scores for the communications are below a certain threshold, the process may determine that the application be moved to a warning or disabled state. After performing such a determination, the process may move the application to the determined state. In one embodiment, the process 340 provides feedback to a user associated with the application. In one embodiment, the feedback may include integrity ratings for the communications of the application, the computed integrity scores for the communications of the application, the collected statistics for the communications, and/or the like. In one embodiment, the provided feedback may be presented on a per communication basis, a per tag basis, and/or an application basis. In one embodiment, the feedback may be presented on a user interface, such as a reporting dashboard. In another embodiment, the feedback may be directly communicated to an operator via a notification mechanism, such as email or SMS messaging.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable storage medium storing executable computer program instructions, the computer program instructions comprising instructions for:

receiving, at a social networking system, a plurality of communications from each of a plurality of applications operated by different entities, the communications each directed to one or more users of the social networking system, the plurality of communications from each of the applications including at least a first group of communications of a first type of content and a second group of communications of a second type of content;

for each of the applications:

receiving, from an application, a first tag and a second tag, wherein the first tag is associated with the first group of the communications and uniquely identifies the first croup of the communications, and the second tag is associated with the second group of the communications and uniquely identifies the second group of the communications;

distributing the first group and the second group of the communications to the one or more users of the social networking system;

monitoring and logging interactions as they are performed on the first group and the second group of the communications of the social networking system by the users of the social networking system;

computing, by a processor of the social networking system, a first integrity score for the first group of the communications associated with the first tag, wherein the first integrity score is based on the monitored interactions performed on the first group of communications of the social networking system by the users of the social networking system, and the first integrity score indicates overall user perception for the first group of the communications;

computing, by the processor, a second integrity score for the second group of the communications associated with the second tag, wherein the second integrity score is based on the monitored interactions performed on the second group of communications of the social networking system by the users of the social networking system, and the second integrity score indicates overall user perception for the second group of the communications:

comparing, by the processor, the first integrity score with the second integrity score to determine how the type of content of the first group and the type of content of the second group are perceived in relation to one another;

generating feedback information based on the comparison of the first integrity score and the second integrity score, the feedback comprising the determination of how the type of content of the first group and the type of content of the second group are perceived in relation to one another; and determining whether to take remedial action based on the first or the second integrity score; and providing feedback for each of the applications to an entity that operates the application based on the determination of the remedial action and the generated feedback information.

2. The non-transitory computer-readable storage medium of claim 1, wherein an application's ability to communicate within the social networking system is based at least in part on the first or the second integrity score.

3. The non-transitory computer-readable storage medium or claim 1, further comprising instructions for: determining whether to take remedial action based on the first or the second integrity score; and blocking additional communications from the application after a determination that remedial action be taken.

4. The non-transitory computer-readable storage medium of claim 1, wherein the monitored interactions include one or more positive user interactions, wherein at least one of the positive interactions is a comment, a share, a click through, and/or a like type interaction.

5. The non-transitory computer-readable storage medium of claim 1, wherein the monitored interactions include one or more negative user interactions, wherein at least one or the negative interactions includes a comment, a hide type interaction, and/or a violation report type interaction.

6. The non-transitory computer-readable storage medium of claim 1, wherein the monitored interactions can be performed by one or more downstream users.

7. The non-transitory computer-readable storage medium of claim 1, wherein the feedback information includes statistics indicating one or more types of interactions performed by the users on the plurality of communications.

8. The non-transitory computer-readable storage medium of claim 1, further comprising instructions for: determining an integrity value for each monitored interaction performed on the plurality of communications, wherein the integrity value is based on a type for the monitored interaction; and determining are integrity score for the application using each of the determined integrity values.

9. The non-transitory computer-readable storage medium of claim 8, further comprising instructions for: determining an operating state for the application based at least in part on the determined integrity score, wherein the state for the application is at least one of: a normal operating state, a warning state, or a disabled state; and preventing the application from directing communications to the one or more users based on the determined operating state for the application.

10. The non-transitory computer-readable storage medium of claim 1, wherein the generated feedback information provided to the entity that operates the application indicates to the entity whether the communications generated by the social application were poorly received by the users and indicates whether the social application is in danger of being subjected to remedial action by the social networking system due to sending poorly received communications to the users.

11. A computer-implemented method comprising:

receiving, at a social networking system, a plurality of communications from each of a plurality of applications operated by different entities, the communications each directed to one or more users of the social networking system, the plurality of communications from each of the applications including at least a first group of communications of a first type of content and a second group of communications of a second type of content;

for each of the applications:

receiving, from an application, a first tag and a second tag, wherein the first tag is associated with the first group of the communications and uniquely identifies the first group of the communications, and the second tag is associated with the second group of the communications and uniquely identifies the second group of the communications;

distributing the first group and the second group of the communications to the one or more users;

monitoring and logging interactions as they are performed on the first group and the second group of the communications of the social networking system by the one or more users of the social networking system;

computing, by a processor of the social networking system, a first integrity score for the first group of the communications associated with the first tag, wherein the first integrity score is based on the monitored interactions performed on the first group of communications of the social networking system by users of the social networking system, the first integrity score indicates overall user perception for the first group of the communications;

computing, by the processor, a second integrity score for the second group of the communications associated with the second tag, wherein the second integrity score is based on the monitored interactions performed on the second group of communications of the social networking system by the users of the social networking system, and the second integrity score indicates overall user perception for the second group of the communications;

comparing, by the processor, the first integrity score with the second integrity score to determine how the type of content of the first group and the type of content of the second group are perceived in relation to one another;

generating feedback information based on the comparison of the first integrity score and the second integrity score, the feedback comprising the determination of how the type of content of the first group and the type of content of the second group are perceived in relation to one another; and determining whether to take remedial action based on the first integrity score or the second integrity score; and sending feedback for each of the applications to an entity that operates the application based on the determination of the remedial action and the first or the second integrity score.

12. The computer-implemented method of claim 11, wherein determining whether to take remedial action comprises:

determining that the first or the second integrity score is within a warning range; and determining to provide feedback to the entity that operates the application based on the determination that the first or the second integrity score is within the warning range, wherein the feedback indicates that the first or the second integrity score for the application is within the warning range.

13. The computer-implemented method of claim 11, further comprising:

receiving additional communications from the application;

monitoring interactions with the additional communications by one or more users;

computing an updated integrity score for the application based the additional communications; and determining whether to take additional remedial actions based on the updated integrity score for the application.

14. The computer-implemented method of claim 11, further comprising computing a set of integrity scores for the application, wherein each integrity score in the set is based on a different category in a set of categories of integrity, and an integrity score in the set is based on a category of integrity that represents user perception for the application with respect to the category of integrity on which the integrity score is based.

15. The computer-implemented method of claim 14, wherein the categories in the set of categories of integrity includes at least a spam category, an offensive category, and an irrelevant category.

16. The computer-implemented method of claim 11, further comprising determining an operating state for the application, wherein the determining the operating state for the application includes:

determining that that the first integrity score falls below an integrity threshold;

disabling the application from initiating the distribution of the first group of communications to the one or more users of the social networking system in response to the determining that the first integrity score falls below the integrity threshold;

determining that that the second integrity score falls below the integrity threshold; and disabling the application from initiating the distribution of the second group of communications to the one or more users of the social networking system in response to the determining that the second integrity score falls below the integrity threshold.

17. The computer-implemented method of claim 16, wherein the integrity threshold is based on an average integrity score for a plurality of applications associated with the social networking system.

* * * * *